United States Patent
Cohen et al.

(10) Patent No.: US 7,480,308 B1
(45) Date of Patent: Jan. 20, 2009

(54) DISTRIBUTING PACKETS AND PACKETS FRAGMENTS POSSIBLY RECEIVED OUT OF SEQUENCE INTO AN EXPANDABLE SET OF QUEUES OF PARTICULAR USE IN PACKET RESEQUENCING AND REASSEMBLY

(75) Inventors: Earl T. Cohen, Fremont, CA (US); John Andrew Fingerhut, Campbell, CA (US); John J. Williams, Jr., Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 680 days.

(21) Appl. No.: 10/812,207

(22) Filed: Mar. 29, 2004

(51) Int. Cl.
*H04L 12/56* (2006.01)

(52) U.S. Cl. .......................... 370/412; 709/238

(58) Field of Classification Search .................. 370/412, 370/231, 394, 60, 316, 218
See application file for complete search history.

(56) References Cited

U.S. PATENT DOCUMENTS

| | | | | |
|---|---|---|---|---|
| 5,396,490 A | * | 3/1995 | White et al. ................. | 370/474 |
| 5,469,433 A | * | 11/1995 | McAuley ..................... | 370/474 |
| 5,548,593 A | | 8/1996 | Peschi | |
| 5,809,024 A | | 9/1998 | Ferguson et al. | |
| 5,920,572 A | * | 7/1999 | Washington et al. ........ | 370/535 |
| 5,936,939 A | * | 8/1999 | Des Jardins et al. ......... | 370/229 |
| 5,949,780 A | | 9/1999 | Gopinath | |
| 5,956,341 A | * | 9/1999 | Galand et al. ................ | 370/412 |
| 5,974,518 A | * | 10/1999 | Nogradi ....................... | 711/173 |
| 6,032,190 A | | 2/2000 | Bremer et al. | |
| 6,064,676 A | * | 5/2000 | Slattery et al. .............. | 370/412 |
| 6,076,117 A | | 6/2000 | Billings | |
| 6,160,651 A | | 12/2000 | Chang et al. | |
| 6,473,435 B1 | * | 10/2002 | Zhou et al. .................. | 370/428 |
| 6,608,813 B1 | * | 8/2003 | Chiussi et al. .............. | 370/218 |
| 6,661,794 B1 | * | 12/2003 | Wolrich et al. .............. | 370/394 |
| 6,661,801 B1 | * | 12/2003 | Richards et al. ............. | 370/412 |
| 6,731,638 B1 | | 5/2004 | Ofek | |
| 6,735,219 B1 | | 5/2004 | Clauberg | |
| 6,744,741 B1 | | 6/2004 | Ju et al. | |

(Continued)

FOREIGN PATENT DOCUMENTS

EP 1 085 723 A2 3/2001

(Continued)

*Primary Examiner*—Thong H Vu
(74) *Attorney, Agent, or Firm*—The Law Office of Kirk D. Williams

(57) ABSTRACT

Packets and packets fragments possibly received out of sequence are distributed into an expandable set of queues. For each particular packet or fragment, a queue within a set of queues is identified that does not contain a packet or packet fragment that is subsequent to the particular packet or fragment, and the particular packet or fragment is enqueued therein. If there is not such a queue available, a new queue is added to the set of queues. A data structure is typically updated for packet fragments to identify when all fragments have been received and the order of queues containing the packet fragments in order of their position within the reassembled packet. This ordered list of the queues is communicated to a reassembly mechanism to retrieve the packet fragments and to reassemble the packet. Resequencing of packets is similarly performed, and may be part of the reassembly process. The list of queues is not always used by the reassembly/resequencing mechanism as the enqueued fragments/packets typically contain sequence numbers.

24 Claims, 7 Drawing Sheets

U.S. PATENT DOCUMENTS

| | | | |
|---|---|---|---|
| 6,788,686 B1* | 9/2004 | Khotimsky et al. | 370/394 |
| 6,819,658 B1* | 11/2004 | Agarwal et al. | 370/316 |
| 6,832,261 B1 | 12/2004 | Westbrook et al. | |
| 6,934,760 B1 | 8/2005 | Westbrook et al. | |
| 6,985,431 B1* | 1/2006 | Bass et al. | 1/1 |
| 7,058,057 B2* | 6/2006 | Dooley et al. | 370/394 |
| 7,139,271 B1* | 11/2006 | Parruck et al. | 370/392 |
| 7,142,540 B2* | 11/2006 | Hendel et al. | 370/392 |
| 7,171,486 B2* | 1/2007 | Narad et al. | 709/232 |
| 7,206,858 B2* | 4/2007 | Hooper et al. | 709/238 |
| 7,298,746 B1* | 11/2007 | De La Iglesia et al. | 370/394 |
| 2002/0091844 A1 | 7/2002 | Craft et al. | |
| 2003/0039250 A1* | 2/2003 | Nichols et al. | 370/394 |
| 2003/0081624 A1* | 5/2003 | Aggarwal et al. | 370/412 |
| 2003/0112757 A1* | 6/2003 | Thibodeau et al. | 370/231 |
| 2003/0120797 A1* | 6/2003 | Brodeur et al. | 709/236 |
| 2004/0037322 A1 | 2/2004 | Sukonik et al. | |
| 2004/0039787 A1 | 2/2004 | Zemach et al. | |
| 2004/0062246 A1* | 4/2004 | Boucher et al. | 370/392 |
| 2005/0041595 A1* | 2/2005 | Uzun et al. | 370/252 |
| 2006/0187822 A1* | 8/2006 | Peleg | 370/229 |

FOREIGN PATENT DOCUMENTS

| | | |
|---|---|---|
| EP | 1 085 723 A3 | 3/2001 |
| WO | WO 02/09307 A1 | 1/2002 |
| WO | WO 02/39667 A2 | 5/2002 |
| WO | WO 02/39667 A3 | 5/2002 |

* cited by examiner

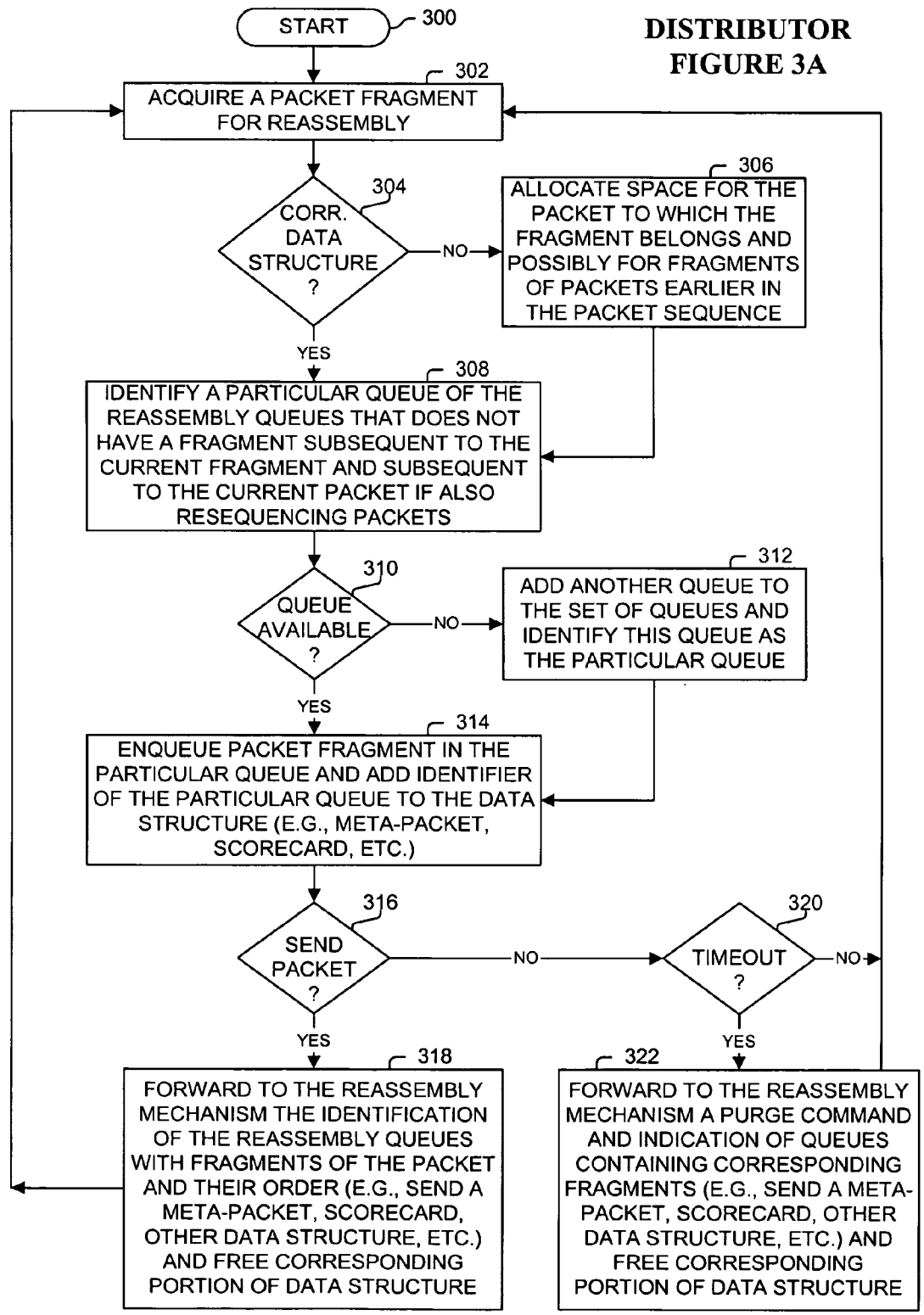

REASSEMBLY MECHANISM

DISTRIBUTOR

**RESEQUENCING MECHANISM

DISTRIBUTING PACKETS AND PACKETS FRAGMENTS POSSIBLY RECEIVED OUT OF SEQUENCE INTO AN EXPANDABLE SET OF QUEUES OF PARTICULAR USE IN PACKET RESEQUENCING AND REASSEMBLY

TECHNICAL FIELD

One embodiment of the invention relates to communications and computer systems, especially networked routers, packet switching systems, and other devices; and more particularly, one embodiment relates to distributing packets and/or packets fragments possibly received out of sequence into an expandable set of queues of particular use in packet resequencing and/or reassembly.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet. Each packet is typically part of a larger set of information being communicated between two entities, and it is desirous and often a requirement that packets of a sequence be delivered in the order specified by that sequence. However, various transmission, packet processing, and packet switching techniques may result in packets arriving out of order at intermediate or final destinations where the packets are needed in their original order. Thus, a packet resequencing technique must be employed, such as storing the packets in random access memory and removing them from the memory in order.

Similarly, a single packet can be split into multiple packet fragments for transmission, processing or other purposes. For example, Multilink Point-to-Point Protocol (MLPPP) and Frame Relay Forum 0.12 (FRF 0.12) break a packet into fragments and transmit these multiple packet fragments over multiple physical links or facilities. These packets fragments are each identified with a packet sequence number to identify the order of the fragments. The receiving device must then reassemble the original packets in order from the received packet fragments as well as detect and recover from any lost packet fragments. One feature that makes this packet reassembly and error detection easier is that packets received over one of the links will, in the most prevalent uses of reassembly, also include a monotonically increasing link sequence number for the corresponding link over which the packet fragment is received or for the set of links over which the packet fragments are received. Although these packet fragments may often be received in order, there are situations for which some of these packet fragments may be received out of order.

Known systems performing packet reassembly use random access memory to reassemble the packets. For example, one technique writes each of the received packet fragments in memory at any location and keeps track of the received fragments and their location in memory in a "scorecard" data structure (e.g., it indicates the memory locations in reassembly order). Based on the scorecard, the packet fragments can be read out of memory in order to reassemble the original packet.

Another known technique allocates a portion of memory large enough to handle a largest size packet, and then stores each packet fragment in this portion of memory at a position relative to the sequence number of the fragment. In this manner, a packet is reassembled in memory, and the contiguous memory locations can be read to generate the reassembled packet.

In another context, merge sorting is a known technique for producing a single sorted list from multiple ordered lists whose values are known a priori. For example, two lists of known elements sorted in ascending order can be combined into a single sorted list by repeatedly taking the smaller value from the front of lists, and appending the smaller value to the end of the combined list. This example can be extended to a set of n known values, which can be sorted by first dividing the set into n lists containing a single value each, then combining pairs of lists to produce n/2 lists with two values each. Pairs of these lists are then merged, producing n/4 lists with four values each. Continuing in this fashion eventually yields a single sorted list containing the original values, but in sorted order. Merge sorting can also be implemented using three-way merging (that is, merging three sorted lists into a single sorted list in one step), rather than by using two-way merging. More generally, d-way merging can be used for any integer d>1. However, merge sorting cannot be used to produce a merged list of items by merging lists where one or more of the lists is not already in sorted order, as the merging technique can only take an item from the front of an input list, and not a next item in order that is not at the front of one of the input lists.

SUMMARY

Disclosed are, inter alia, methods, apparatus, data structures, computer-readable media, mechanisms, and means for distributing packets and/or packets fragments possibly received out of sequence into an expandable set of queues of particular use in packet resequencing and/or reassembly. Typically for each particular packet or fragment, a queue within a set of queues is identified that does not contain a packet or packet fragment that is subsequent to the particular packet or fragment, and the particular packet or fragment is enqueued therein. If there is no such queue available, a new queue is added to the set of queues. Note, a fragment can be enqueued in a queue that contains a fragment whose position is earlier in the reassembled packet to which the fragments belong.

By storing fragments in this arrangement, first-in first-out (FIFO) queues can be used and fragments can be removed from the queues in the order they belong in the reassembled packet. FIFO queues may be implemented very efficiently in hardware and at rates faster than that available using random access memory. (FIFO queues eliminate the need to track the addresses of specific packet fragments or packets, which makes it more efficient in hardware to support an arbitrarily large number of packet fragments or packets.)

A data structure is typically updated for packet fragments after the queue is determined to reflect when all fragments of a given packet have been received. The data structure specifies the order of queues containing the packet fragments in order of their position within the reassembled packet. This ordered list of the queues is communicated to a reassembly mechanism to retrieve the packet fragments and to reassemble the packet. Resequencing of packets is similarly performed and may be part of the reassembly process. In one embodiment, the list of queues is not used by the reassembly/ resequencing mechanism as the fragments/packets stored in the queues contain sequence numbers, and thus their ordering can identified from the queued fragments/packets.

One embodiment reassembles a packet. A set of multiple queues is maintained. For each particular packet fragment, a particular queue of the set of queues is identified such that no already queued packet fragment in the particular queue comes after the particular packet fragment in the reassembled packet. This identification includes checking, at least when the particular queue is not empty, that the particular queue does not include a packet fragment which comes after the particular packet fragment. The particular packet fragment is then enqueued at the end of the particular queue, and a data structure is updated to include an indication of the particular queue in relation to the position of the particular packet fragment in the packet. The packet fragments are dequeued from the packet queues based on the data structure to produce the reassembled packet, such as in response to identifying that all of packet fragments have been enqueued.

In one embodiment, in response to identifying that no queue is available to enqueue the particular packet fragment (i.e., each queue has a fragment which comes after the particular packet fragment in the reassembled packet), the set of queues is expanded by adding the particular queue to the set of queues. One embodiment reduces the number of queues in the set of queues in response to identifying that the particular queue is empty, which may include removing the particular queue from the set of queues. In one embodiment, the packet fragments are retrieved from the set of queues in order of their respective position within the packet. In one embodiment, the data structure corresponds to a meta-packet or scorecard including the indications of the queues in an order corresponding to the positions of their corresponding packet fragments within the reassembled packet. In one embodiment, at least two packet fragments of the packet are enqueued in a same queue.

One embodiment resequences packets. A set of queues is maintained. A particular queue is identified for each packet of a stream of packets based on the packet's sequence number such that no packet subsequent to the packet has already been enqueued in the queue, and the corresponding packet is enqueued therein. Packets can then be retrieved in their order from the set of queues to form the resequenced stream of packets. In one embodiment, if no such queue is currently available, a queue is added to the set of queue, and the packet enqueued therein. One embodiment, reduces the number of queues in response to identifying that one of the queues is empty (e.g., an empty queue is removed from the set of queues).

One embodiment resequences and reassembles packets. Multiple queues are maintained. A packet fragment of multiple packet fragments of a packet of a stream of packets is received. A particular queue is identified by checking a data structure or the queues for the particular packet fragment such that no already queued packet fragment in the particular queue comes after the particular packet fragment in the packet and the particular queue includes no already queued packet fragment of a packet subsequent to the particular packet in the stream of packets. The particular packet fragment is enqueued at the end of the particular queue, and a data structure is updated to include an indication of the particular queue in relation to the position of the particular packet fragment in the packet and the stream of packets. The packet fragments are retrieved based on the data structure to produce the packet. In one embodiment, the packet fragments for a packet are retrieved in response to identifying that all of the plurality of packet fragments have been enqueued in the plurality of queues and no other packet prior to the packet in the stream of packets is enqueued in the plurality of queues. In one embodiment, the number of queues available for enqueuing packet fragments can dynamically increase and decrease.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 3A is a flow diagram of a process for distributing packet fragments to a set of queues used in one embodiment;

DETAILED DESCRIPTION

Figure 1A:
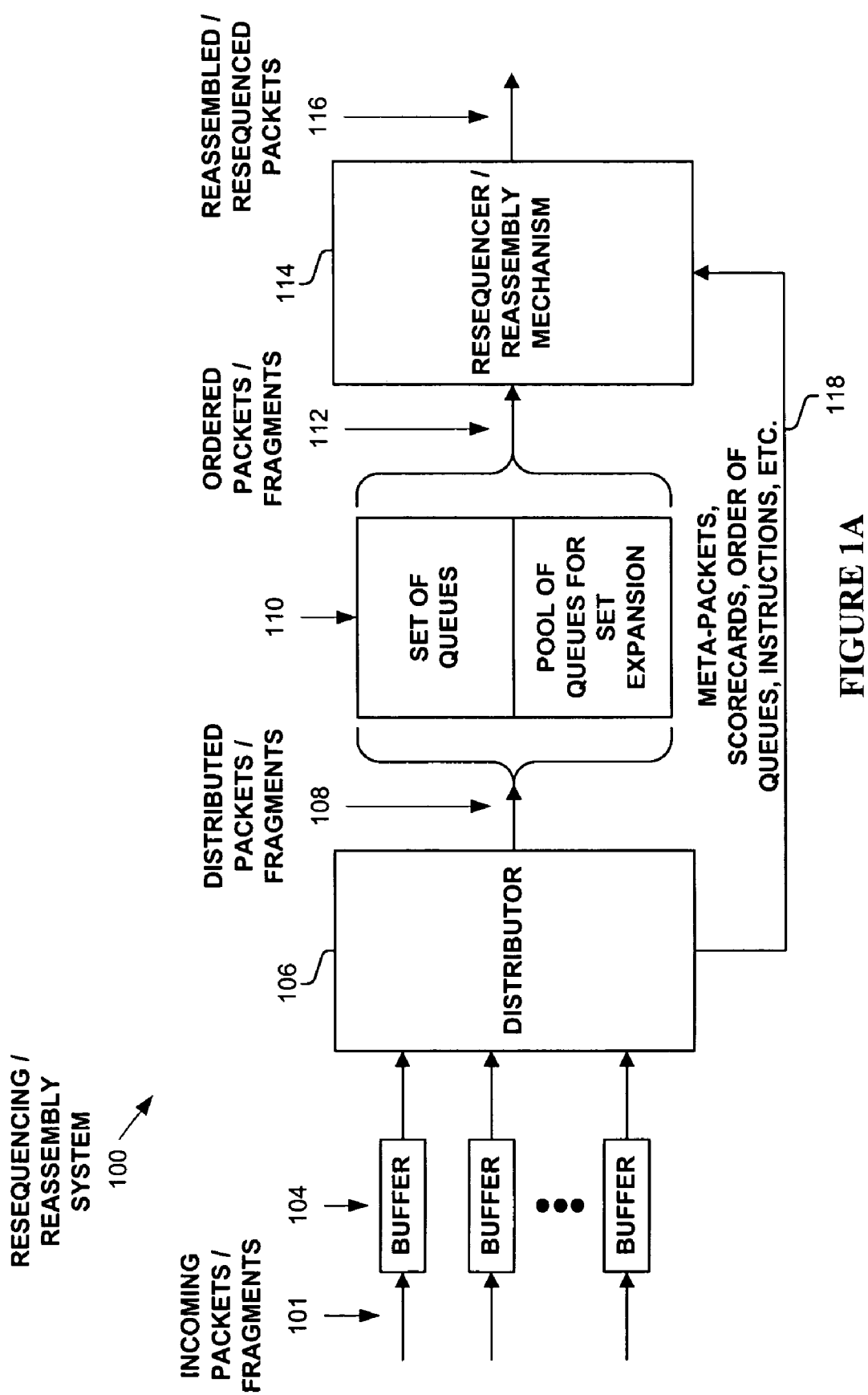
FIG. 1A is a block diagram of a reassembly and/or resequencing system used in one embodiment.

Disclosed are, inter alia, methods, apparatus, data structures, computer-readable media, mechanisms, and means for distributing packets and/or packets fragments possibly received out of sequence into an expandable set of queues of particular use in packet resequencing and/or reassembly.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for distributing packets and/or packets fragments possibly received out of sequence into an expandable set of queues of particular use in packet resequencing and/or reassembly. Typically for each particular packet or fragment, a queue within a set of queues is identified that does not contain a packet or packet fragment that is subsequent to the particular packet or fragment, and the particular packet or fragment is enqueued therein. If there is no such queue available, a new queue is added to the set of queues. Note, a fragment can be enqueued in a queue that contains a fragment whose position is earlier in the reassembled packet to which the fragments belong.

By storing fragments in this arrangement, first-in first-out (FIFO) queues can be used and fragments can be removed from the queues in the order they belong in the reassembled packet. FIFO queues may be implemented very efficiently in hardware and at rates faster than that available using random access memory. (FIFO queues eliminate the need to track the addresses of specific packet fragments or packets, which makes it more efficient in hardware to support an arbitrarily large number of packet fragments or packets.)

A data structure is typically updated for packet fragments after the queue is determined to reflect when all fragments of a given packet have been received. The data structure specifies the order of queues containing the packet fragments in order of their position within the reassembled packet. This ordered list of the queues is communicated to a reassembly mechanism to retrieve the packet fragments and to reassemble the packet. Resequencing of packets is similarly performed and may be part of the reassembly process. In one embodiment, the list of queues is not used by the reassembly/resequencing mechanism as the fragments/packets stored in the queues contain sequence numbers, and thus their ordering can identified from the queued fragments/packets.

One embodiment reassembles a packet. A set of multiple queues is maintained. For each particular packet fragment, a particular queue of the set of queues is identified such that no already queued packet fragment in the particular queue comes after the particular packet fragment in the reassembled packet. This identification includes checking, at least when the particular queue is not empty, that the particular queue does not include a packet fragment which comes after the particular packet fragment. The particular packet fragment is then enqueued at the end of the particular queue, and a data structure is updated to include an indication of the particular queue in relation to the position of the particular packet fragment in the packet. In response to identifying that all of packet fragments have been enqueued, the packet fragments are dequeued from the packet queues based on the data structure to produce the reassembled packet.

In one embodiment, in response to identifying that no queue is available to enqueue the particular packet fragment (i.e., each queue has a fragment which comes after the particular packet fragment in the reassembled packet), the set of queues is expanded by adding the particular queue to the set of queues. One embodiment reduces the number of queues in the set of queues in response to identifying that the particular queue is empty, which may include removing the particular queue from the set of queues. In one embodiment, the packet fragments are retrieved from the set of queues in order of their respective position within the packet. In one embodiment, the data structure corresponds to a meta-packet or scorecard including the indications of the queues in an order corresponding to the positions of their corresponding packet fragments within the reassembled packet. In one embodiment, at least two packet fragments of the packet are enqueued in a same queue.

One embodiment resequences packets. A set of queues is maintained. A particular queue is identified for each packet of a stream of packets based on the packet's sequence number such that no packet subsequent to the packet has already been enqueued in the queue, and the corresponding packet is enqueued therein. Packets can then be retrieved in their order from the set of queues to form the resequenced stream of packets. In one embodiment, if no such queue is currently available, a queue is added to the set of queue, and the packet enqueued therein. One embodiment, reduces the number of queues in response to identifying that one of the queues is empty (e.g., an empty queue is removed from the set of queues).

One embodiment resequences and reassembles packets. Multiple queues are maintained. A packet fragment of multiple packet fragments of a packet of a stream of packets is received. A particular queue is identified by checking a data structure or the queues for the particular packet fragment such that no already queued packet fragment in the particular queue comes after the particular packet fragment in the packet and the particular queue includes no already queued packet fragment of a packet subsequent to the particular packet in the stream of packets. The particular packet fragment is enqueued at the end of the particular queue, and a data structure is updated to include an indication of the particular queue in relation to the position of the particular packet fragment in the packet and the stream of packets. The packet fragments are retrieved based on the data structure to produce the packet. In one embodiment, the packet fragments for a packet are retrieved in response to identifying that all of the plurality of packet fragments have been enqueued in the plurality of queues and no other packet prior to the packet in the stream of packets is enqueued in the plurality of queues. In one embodiment, the number of queues available for enqueuing packet fragments can dynamically increase and decrease.

In one embodiment, the packet fragments themselves have sequence numbers, and arrive over a set of physical links with the property that the sequence numbers are monotonically increasing on a given physical link (as in MLPPP). By assigning FIFO queues per physical link, and by using a data structure recording which FIFO queue contains each arrived sequence number, the packet fragments comprising a given packet can be reassembled, and the packets can be resequenced, by reading the appropriate packet fragments from the heads of the FIFO queues (as indicated by the data structure), once the last packet fragment of a packet has arrived.

In one embodiment, the arrival of a sequence number on a physical link completes the data structure to a point where it is known that a packet fragment has been lost (or a rule such as sequence numbers monotonically increasing on a given physical link would be violated). The data structure can then be used to drop all the packet fragments up to and including the missing packet fragment, plus any other fragments required to get to the start of the next packet.

One embodiment resequences packets. A set of queues is maintained. A particular queue is identified for each packet of a stream of packets based on the packet's sequence number such that no packet subsequent to the packet has already been enqueued in the queue, and the corresponding packet is enqueued therein. Packets can then be retrieved in their order from the set of queues to form the resequenced stream of packets. In one embodiment, if no such queue is currently available, a queue is added to the set of queue, and the packet enqueued therein. One embodiment, reduces the number of queues in response to identifying that one of the queues is empty (e.g., an empty queue is removed from the set of queues).

In one embodiment, the data structure or scorecard is directly indexed by the sequence number of the arriving packet fragment. As each packet fragment arrives, the FIFO queue number on which it is enqueued is written in to the data structure or scorecard at an index determined directly by its sequence number. When the last packet fragment of a packet arrives, a consecutive group of entries in the data structure or scorecard will be valid, indicating that the corresponding packet is available for reassembly. Furthermore, assuming that no packets are lost, a packet fragment will arrive which completes such a consecutive group of entries at the head of the data structure or scorecard; this group can then be used to provide reassembly directions for the corresponding packet or packets at the heads of the FIFO queues, and the consecutive group of entries can then be removed from the data structure or scorecard.

One embodiment maintains the FIFO queues and operates the reassembly/resequencing mechanism with hardware processes, whereas the data structure or scorecard is maintained and updated by software processes, such as by code running on a network processor.

FIG. 1A is a block diagram of a reassembly and/or resequencing system 100 used in one embodiment. As shown, incoming packets/fragments 101 are typically stored in one or more temporary storage buffers 104. For example, packet fragments of a packet could be received over multiple links and temporarily stored in buffers 104 for processing by distributor 106. Distributor 106 processes the acquired packets/fragments by distributing packets/fragments 108 to a set of queues 110, with the active set of queues typically being expandable/shrinkable to accommodate the distribution requirements. For example, more active queues are required when packets/fragments are received out of order, and especially when smaller sequence-numbered packets/fragments are received much later than larger sequence-numbered packets/fragments. Set of queues 110 typically includes a set of active queues which are currently in use, as well as a pool of expansion queues which can be added to and removed from the active set of queues as needed. These expansion queues are possibly used for other purposes when they are not in the active set of queues. The distributed packets/fragments 108 are placed in queues 110 such that no packet/fragment subsequent to another packet/fragment is placed before it in a same queue. In this manner, packets/fragments can be retrieved in sequence directly from the set of queues 110. Thus, FIFO queues can be employed. FIFO queues can be implemented in hardware such that they are more efficient and faster than that available using random access memory, which allows packets/fragments to be resequenced/reassembled for lower hardware cost and at very high line rates.

Distributor 106 typically maintains a data structure to identify the order of queues that contain packets/fragments in the order within the sequence of fragments or reassembled packets. This information is typically communicated as indicated by reference number 118 to resequencer/reassembly mechanism 114, such that it can readily remove packets/fragments from set of queues 110 in the desired order as indicated by reference number 112, so as to produce the desired resequenced packet streams/reassembled packets 116.

Figure 2:
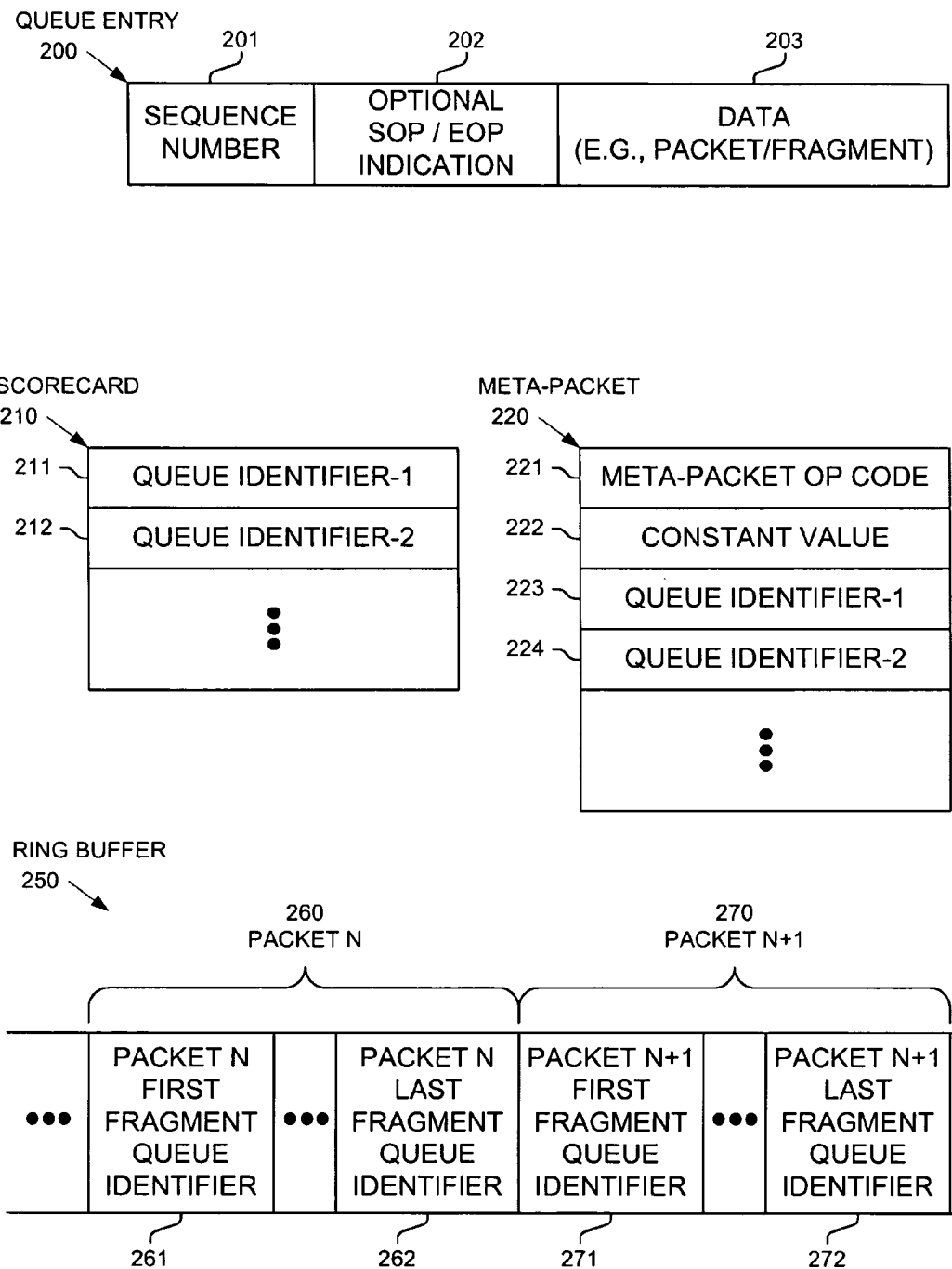
FIG. 2 is a block diagram illustrating different data structures used in one embodiment.

FIG. 2 illustrates a few data structures used in one embodiment. Queue entry 200, used in one embodiment, includes a sequence number 201, an indication 202 of whether the stored fragment corresponds or does not correspond to a start of packet or end of packet (used in one embodiment that reassembles packets), and data 203 (e.g., the packet or fragment).

Scorecard 210 data structure is used in one embodiment, with scorecard 210 including a list 211-212 of queues corresponding to the resequencing/reassembly order.

Meta-packet 220 data structure similarly provides a list of queues 223-224 corresponding to the resequencing/reassembly order, and typically includes an operation code 221 to identify the type of packet, and optionally a constant value 222 which may be added to the reassembled packet for example.

Ring buffer 250 is used in one embodiment for maintaining indications of received and enqueued packets or packet fragments. Illustrated is a storage for packet 260 with corresponding packet fragment indications 261-262 and for a next packet 270 with corresponding packet fragment indications 271-272. In one embodiment which resequences whole packets, a single entry is included in ring buffer 260 for each packet (e.g., there are no packet fragments and 261-262 correspond to a single queue identifier).

Typically when a first packet fragment of a packet is received, space is allocated in ring buffer 250 for all fragments of the corresponding packet. In one embodiment in which packet resequencing is also performed, if a packet fragment is received for a packet which comes after another packet in sequence for which space has not already been allocated (e.g., one of its packet fragments has not been previously received), then space is allocated in ring buffer 250 for the previous one or more packets as well as the packet to which the received fragment belongs.

Thus, in one embodiment, a required packet sequence includes packet 260 followed by next packet 270. However, in one embodiment, next packet 270 corresponds to some packet for which a first packet fragment was received after a first packet fragment of packet 260, and the order of packets 260 and 270 do not matter. In fact, in one embodiment, if all fragments of packet 270 are received before all fragments of packet 260 (as determined, for example, by each entry 271-272 including a queue identifier), then packet 270 is allowed to be sent out prior to packet 260. In one embodiment, packet 260 is always sent prior to sending packet 270 (assuming all packet fragments are timely received), whether due a resequencing requirement or the implementation of the embodiment.

Figure 1B:
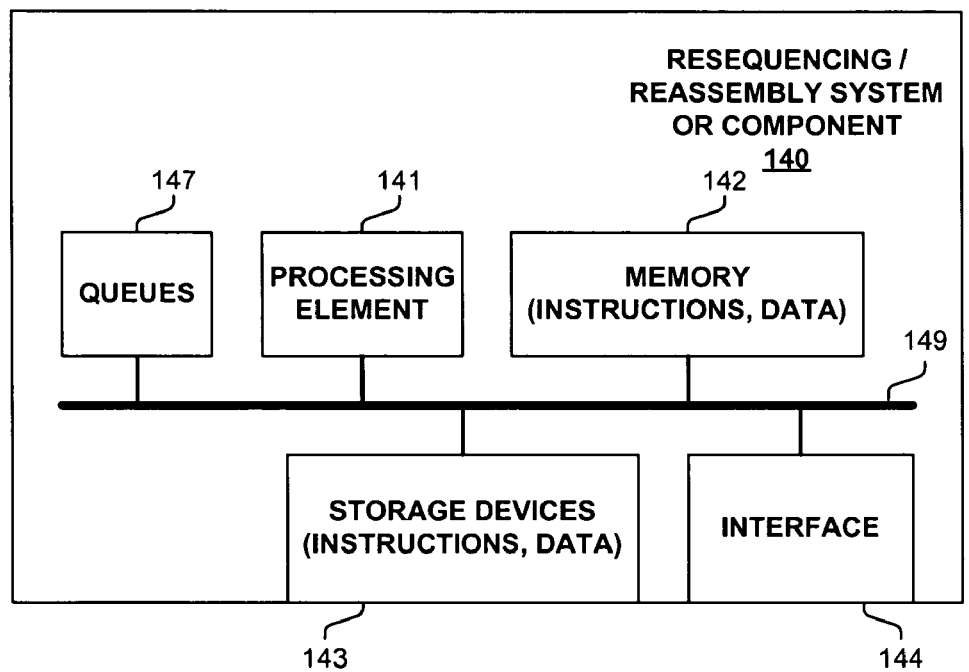
FIG. 1B is a block diagram of a system or component used in one embodiment for distributing packets and/or packet fragments to a set of queues and/or for packet resequencing and/or reassembly.

FIG. 1B is a block diagram of a system or component 140 used in one embodiment for distributing packets and/or packet fragments to a set of queues 147 and/or for packet resequencing and/or reassembly of packets/fragments stored in queues 147 or elsewhere. In one embodiment, system or component 140 performs one or more processes corresponding to one of the flow diagrams illustrated or otherwise described herein. For example, in one embodiment, distributor and/or reassembly/resequencing mechanism processes run on processing element 141 using queues 147 for reassembling packet fragments and/or resequencing packets.

In one embodiment, system or component 140 includes a processing element 141, memory 142, storage devices 143, an interface 144 for sending and receiving packets/fragments, items, and/or other information, and queues 147, which are typically coupled via one or more communications mechanisms 149, with the communications paths typically tailored to meet the needs of the application. Various embodiments of component 140 may include more or less elements. The operation of component 140 is typically controlled by processing element 141 using memory 142 and storage devices 143 to perform one or more tasks or processes. Memory 142 is one type of computer-readable medium, and typically comprises random access memory (RAM), read only memory (ROM), flash memory, integrated circuits, and/or other memory components. Memory 142 typically stores computer-executable instructions to be executed by processing element 141 and/or data which is manipulated by processing element 141 for implementing functionality in accordance with an embodiment. Storage devices 143 are another type of computer-readable medium, and typically comprise solid state storage media, disk drives, diskettes, networked services, tape drives, and other storage devices. Storage devices 143 typically store computer-executable instructions to be executed by processing element 141 and/or data which is manipulated by processing element 141 for implementing functionality in accordance with an embodiment. Queues 147 typically correspond to hardware-implemented FIFO queues. However, one embodiment does not include or use queues 147, but rather implements the required set of queues using memory 142.

FIG. 3A is a flow diagram of a process for distributing packet fragments to a set of queues used in one embodiment. Processing begins with process block 300, and proceeds to process block 302, wherein a packet fragment is acquired of a packet to be reassembled and possibly resequenced. A determination is made in process block 304 as to whether a data structure (e.g., a new data structure or space in an existing data structure) has already been established for the corresponding reassembled packet, and possibly for fragments of packets prior in sequence to the packet to which the acquired packet belongs. If not, in process block 306, space is allocated for use in reassembly and possibly resequencing of the packet (e.g., space for all fragments of the packet to which the acquired packet belongs, and possibly for fragments of packets earlier in a sequence of packets). For example, one embodiment uses a ring buffer, table or array to keep track of received fragments and the queues in which the fragments are enqueued for each active packet being reassembled.

Next, in process block 308, a particular queue is identified which does not have a fragment enqueued to it which is subsequent to the current packet fragment, and if resequencing of packet is being performed, then also does not have a fragment of a packet subsequent to the packet to which the acquired packet fragment belongs. This processing can be performed in an unlimited number of ways, such as maintaining a latest sequence number enqueued per queue for the packet being reassembled, checking the maintained data structure, etc. As determined in process block 310, if no such queue is available, then in process block 312, another queue is added to the set of active queues and will be used to enqueue the current fragment. In process block 314, the current fragment is enqueued to the identified particular queue and an identifier of the identified particular queue is added to the maintained data structure so as to identify the queue and the current fragment's position in the reassembled packet.

As determined in process block 316, if all fragments have been received for a packet being reassembled, then in process block 318, an identification of the queues having a corresponding fragment enqueued therein in the reassembly order is communicated to the reassembly mechanism typically via a meta-packet, scorecard or other communication mechanism, and the corresponding space is freed in the data structure in the distributor. Otherwise, as determined in process block 320, if a timeout has occurred (i.e., the fragments should be purged from the queues and the packet to be reassembled dropped), then in process block 322, an instruction to drop the packet being reassembled and an identification of the queues having a corresponding fragment enqueued therein in the reassembly order is communicated to the reassembly mechanism typically via a meta-packet, scorecard or other communication mechanism (or the queues and the number of fragments in each queue to purge), and the corresponding space is freed in the data structure in the distributor. Processing returns to process block 302 to acquire and process another packet fragment.

Figure 3B:
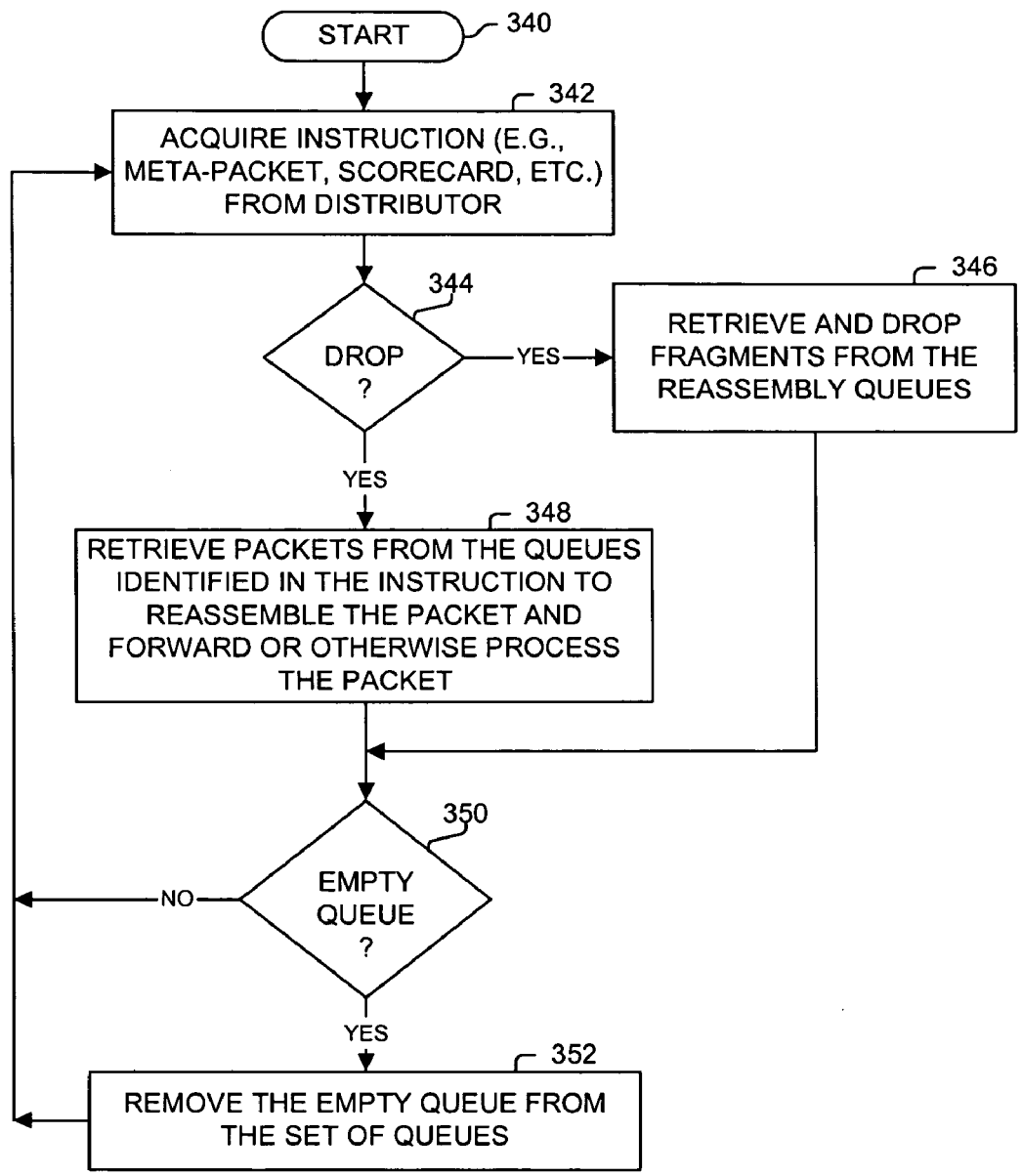
FIG. 3B is a flow diagram of a process for removing packet fragments from a set of queues and reassembling packets used in one embodiment.

FIG. 3B is a flow diagram of a process for removing packet fragments from a set of queues and reassembling packets used in one embodiment. Processing begins with process block 340, and proceeds to process block 342 wherein an instruction is acquired from the distributor to reassemble or drop the packet. As determined in process block 344, if the packet fragments are to be dropped, then in process block 346, the corresponding packet fragments are retrieved from the queues and dropped. Otherwise, in process block 348, the packets are retrieved from the queues, typically in the order specified in the instruction (e.g. meta-packet, scorecard, etc.), and the reassembled packet is forwarded or otherwise processed. As determined in process block 350, if a queue has become empty, then in process block 352, one embodiment frees the queue (i.e., removes it from the active set of queues). Processing returns to process block 342 to acquire and process a next instruction.

Figure 4A:
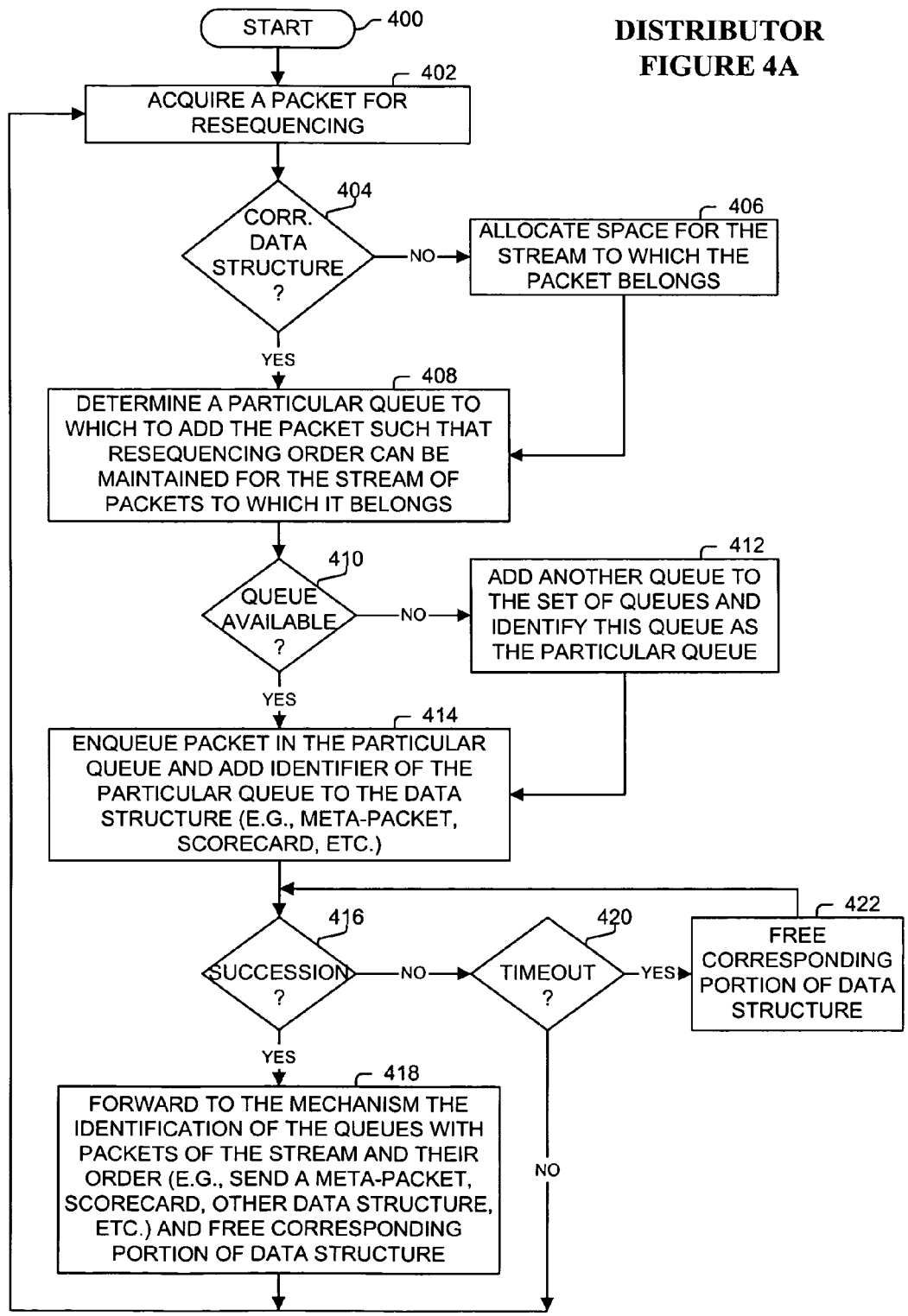
FIG. 4A is a flow diagram of a process for distributing packets to a set of queues used in one embodiment.

FIG. 4A is a flow diagram of a process for distributing packets to a set of queues used in one embodiment. Processing begins with process block 400, and proceeds to process block 402, wherein a packet is acquired for resequencing (e.g., packets delayed too long are ignored). A determination is made in process block 404 as to whether a data structure (e.g., a new data structure or space in an existing data structure) has already been established for the corresponding packet stream being resequenced. If not, in process block 406, space is allocated for use in resequencing of the packet stream (e.g., a ring buffer or other data structure).

Next, in process block 408, a particular queue is identified which does not have a packet enqueued to it which is subsequent to the current packet in the stream of packets. This processing can be performed in an unlimited number of ways, such as maintaining a latest sequence number enqueued per queue for the packet stream being resequenced, checking the maintained data structure, etc. As determined in process block 410, if no such queue is available, then in process block 412, another queue is added to the set of active queues and will be used to enqueue the current packet. In process block 414, the current packet is enqueued to the identified particular queue and an identifier of the identified particular queue is added to the maintained data structure so as to identify the queue and the current packet's position in the resequenced stream of packets.

As determined in process block 416, if there is a succession of packets in the queues that can be resequenced (e.g., a sequence of one or more packets with sequence numbers beginning with the next sequence number), then in process block 418, an identification of the queues having a corresponding packet enqueued therein in the resequencing order is communicated to the resequencing mechanism typically via a meta-packet, scorecard or other communication mechanism, and the corresponding space is freed in the data structure in the distributor. Otherwise, as determined in process block 420, if a timeout has occurred (i.e., the missing packet should be dropped to allow subsequent packets to proceed), then in process block 422, the corresponding space is freed in the data structure in the distributor for the one or more packets to be dropped, and processing returns to process block 416. Processing then returns to process block 402 to acquire and process another packet.

Figure 4B:
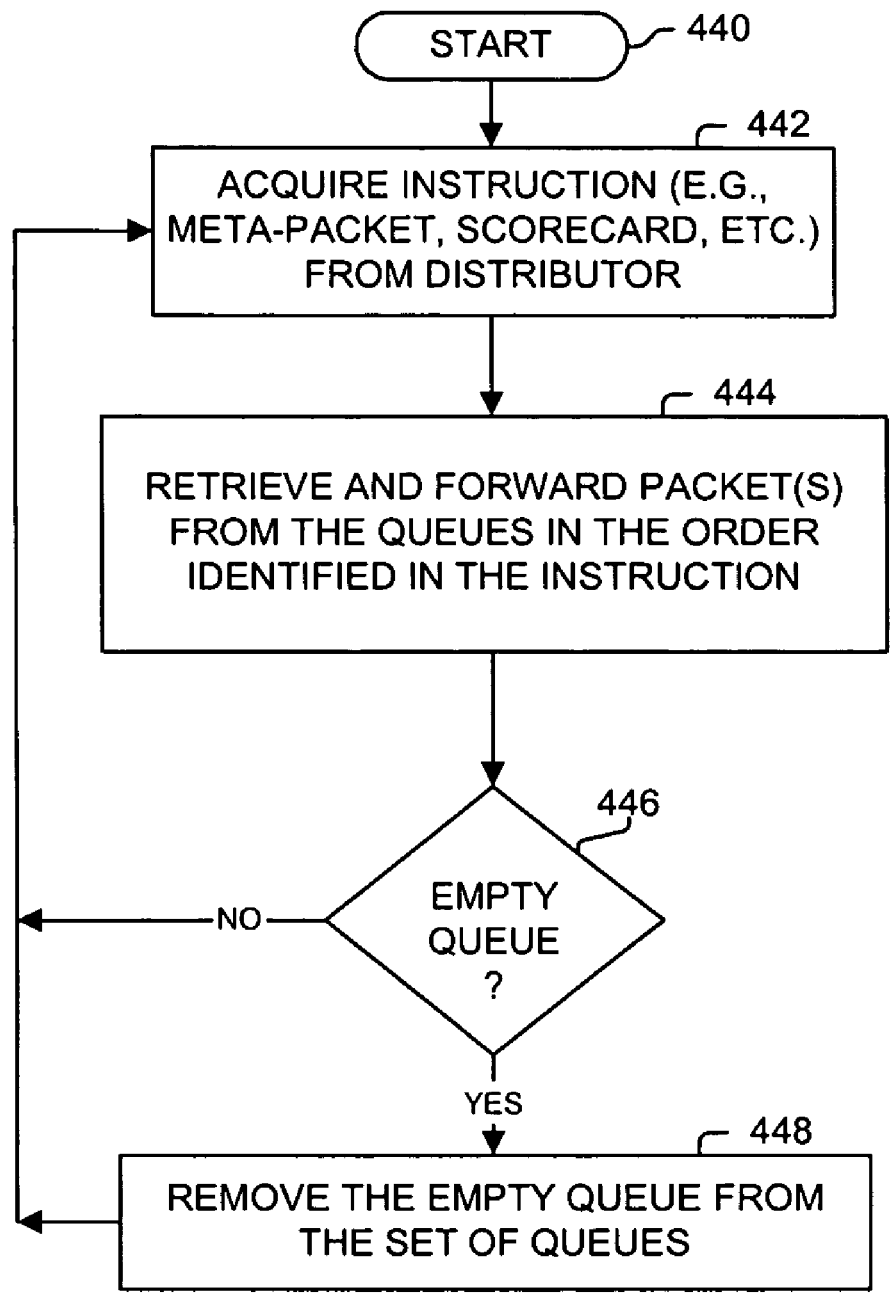
FIG. 4B is a flow diagram of a process for removing packets from a set of queues in resequencing a stream packets used in one embodiment.

FIG. 4B is a flow diagram of a process for removing packets from a set of queues in resequencing a stream packets used in one embodiment. Processing begins with process block 440, and proceeds to process block 442 wherein an instruction is acquired from the distributor. In process block 444, the packets are retrieved from the queues, typically in the order specified in the instruction (e.g. meta-packet, scorecard, etc.), and the packet or packets are is forwarded or otherwise processed in their resequenced order. As determined in process block 446, if a queue has become empty, then in process block 448, one embodiment frees the queue (i.e., removes it from the active set of queues). Processing returns to process block 442 to acquire and process a next instruction.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for reassembling a packet, the packet when reassembled includes a plurality of packet fragments with each packet fragment identified with a position within the packet, the method comprising:
maintaining a plurality of queues;
enqueuing the plurality of packet fragments in a plurality of the plurality of queues, and
retrieving the plurality of packet fragments from the plurality of packet queues based on indications added to a data structure identifying the order of the plurality of packet fragments to produce the packet;
wherein said operation of enqueuing the plurality of packet fragments in the plurality of the plurality of queues includes, for each particular packet fragment of the plurality of packet fragments: identifying a particular queue of the plurality of queues such that no already queued packet fragment of the packet in the particular queue comes after the particular packet fragment in the packet, wherein said identifying the particular queue for the particular packet fragment includes checking, at least when the particular queue is not empty, that the particular queue does not include a packet fragment which comes after the particular packet fragment in the packet; enqueuing the particular packet fragment at the end of the particular queue; and updating the data structure to include an indication of the particular queue in relation to the position of the particular packet fragment in the packet.

2. The method of claim 1, wherein said retrieving the plurality of packet fragments is performed in response to identifying that all of the plurality of packet fragments have been enqueued in the plurality of queues.

3. The method of claim 1, wherein said operation of enqueuing the plurality of packet fragments in the plurality of the plurality of queues includes identifying that no queue in the plurality of queues does not already have enqueued a packet fragment which comes after the particular packet fragment in the packet, and in response, expanding the plurality of queues by adding a queue to the plurality of queues.

4. The method of claim 3, including reducing the number of queues in the plurality of queues in response to identifying that a queue is empty.

5. The method of claim 1, wherein the data structure corresponds to a meta-packet or scorecard including the indications of the queues of the plurality of queues maintained in an order corresponding to the positions of their corresponding packet fragments within the packet.

6. The method of claim 1, wherein at least two packet fragments of the packet are enqueued in a same queue of the plurality of queues.

7. A method for resequencing packets, the method comprising:
maintaining a plurality of queues of a resequencing mechanism;
receiving a particular packet of a stream of packets, each packet of the stream of packets identifying a sequence number of an ordered sequence of sequence numbers, the particular packet including a particular sequence number;
identifying a particular queue of the plurality of queues such that no packet in the particular queue includes a sequence number subsequent to the particular sequence number in the ordered sequence, wherein said identifying the particular queue includes checking that the particular queue does not include a packet with a sequence number subsequent to the particular sequence number in the ordered sequence;
enqueuing the particular packet at the end of the particular queue; and
retrieving packets in sequence from the plurality of queues.

8. The method of claim 7, including identifying that no queue in the plurality of queues does not include a packet with a sequence number subsequent to the particular sequence number in the ordered sequence, and in response, expanding the plurality of queues by adding the particular queue to the plurality of queues; and wherein said identifying the particular queue includes said checking operation when the particular queue is not empty.

9. The method of claim 8, including reducing the number of queues in the plurality of queues in response to identifying that the particular queue is empty.

10. The method of claim 9, wherein said reducing the number of queues includes removing the particular queue from the plurality of queues.

11. An apparatus for reassembly of a packet, the packet when reassembled includes a plurality of packet fragments with each packet fragment identified with a position within the packet, the apparatus comprising:
a plurality of reassembly queues;
a reassembly mechanism; and
a distributor configured for each particular packet fragment of the plurality of packet fragments: to acquire the particular packet fragment of the plurality of packet fragments, to identify a particular queue of the plurality of reassembly queues such that no already queued packet fragment in the particular queue comes after said particular packet fragment in the packet; to cause said particular packet fragment to be enqueued at the end of the particular queue; and to update a data structure to include an indication of the particular queue in relation to the position of said particular packet fragment in the packet; wherein said identifying the particular queue includes checking, at least when the particular queue is not empty, that the particular queue does not include a packet fragment which comes after said particular packet fragment in the packet; and wherein at least a plurality of said reassembly queues contains one or more of the plurality of packet fragments; and wherein the distributor is configured to identify when all packet fragments of the packet have been received and in response, to provide the reassembly mechanism with indications of the queues of the plurality of reassembly queues containing packet fragments of the packet and their order corresponding to that of the order of the plurality of packet fragments in the packet; and wherein the reassembly mechanism is configured to retrieve the plurality of packet fragments from the plurality of resequencing queues based on the indications added to the data structure and reassemble the plurality of packet fragments to produce the packet.

12. The apparatus of claim 11, wherein the reassembly mechanism is configured to retrieve the plurality of packet fragments from the plurality of resequencing queues in their respective order within the packet.

13. The apparatus of claim 11, wherein the distributor is configured to communicate a meta-packet or scorecard including said indications of the queues to the reassembly mechanism.

14. The apparatus of claim 11, wherein the distributor is configured to identify that every queue in the plurality of queues already includes a packet fragment corresponding to subsequent position in the packet and in response, causing the plurality of queues to expand in number by adding the particular queue to the plurality of queues.

15. The apparatus of claim 14, wherein the apparatus is configured to reduce the number of queues in the plurality of queues in response to identifying that the particular queue is empty.

16. The apparatus of claim 11, wherein the distributor identifies a same particular queue of the plurality of reassembly queues for at least two of the plurality of packet fragments.

17. A method for resequencing and reassembling of packets, the method comprising:

maintaining a plurality of queues;

acquiring a packet fragment of a plurality of packet fragments of a packet, wherein a stream of a plurality of packets includes the packet;

identifying a particular queue of the plurality of queues for the particular packet fragment such that no already queued packet fragment in the particular queue comes after the particular packet fragment in the packet and the particular queue includes no already queued packet fragment of a packet subsequent to the particular packet in the stream of packets; wherein said identifying the particular queue includes checking, at least when the particular queue is not empty, that the particular queue does not include a packet fragment which comes after the particular packet fragment in the packet or the stream of packets; enqueuing the particular packet fragment at the end of the particular queue; and updating a data structure to include an indication of the particular queue in relation to the position of the particular packet fragment in the packet and the stream of packets; and retrieving the plurality of packet fragments from the plurality of packet queues based on the data structure to produce the packet.

18. The method of claim 17, wherein said retrieving the plurality of packet fragments is performed in response to identifying that all of the plurality of packet fragments have been enqueued in the plurality of queues and no other packet prior to the packet in the stream of packets is enqueued in the plurality of queues.

19. The method of claim 17, including identifying that no queue in the plurality of queues does not already have enqueued a packet fragment in the particular queue which comes after the particular packet fragment in the packet or a packet fragment of a packet subsequent to the packet, and in response, expanding the plurality of queues by adding the particular queue to the plurality of queues.

20. The method of claim 19, including reducing the number of queues in the plurality of queues in response to identifying that the particular queue is empty.

21. The method of claim 20, wherein said reducing the number of queues includes removing the particular queue from the plurality of queues.

22. The method of claim 17, wherein the plurality of packet fragments are retrieved from the plurality of queues in order of their respective position within the packet and the order of the packet within the steam of packets.

23. The method of claim 17, wherein the data structure corresponds to a meta-packet or scorecard including the indications of the queues of the plurality of queues maintained in an order corresponding to the positions of their corresponding packet fragments within the packet.

24. The method of claim 17, wherein at least two packet fragments of the packet are enqueued in a same queue of the plurality of queues.

\* \* \* \* \*